United States Patent [19]

Hunte

[11] Patent Number: 5,781,406
[45] Date of Patent: Jul. 14, 1998

[54] COMPUTER DESKTOP KEYBOARD COVER WITH BUILT-IN MONITOR SCREEN & WRIST-SUPPORT ACCESSORY

[76] Inventor: Stanley G. Hunte, 1235 S. 13th Ave., Maywood, Ill. 60153

[21] Appl. No.: 611,201

[22] Filed: Mar. 5, 1996

[51] Int. Cl.[6] ............................. G06F 1/16; H05K 5/03
[52] U.S. Cl. ................................ 361/680; 361/681
[58] Field of Search ............................. 361/679–683, 361/686; 364/708.1; 400/691, 713, 714, 719; G06F 1/16

[56] References Cited

U.S. PATENT DOCUMENTS

| | | | |
|---|---|---|---|
| 4,749,364 | 6/1988 | Arney et al. | 439/372 |
| 4,903,221 | 2/1990 | Krenz | 364/708.1 |
| 5,128,662 | 7/1992 | Failla | 340/752 |
| 5,442,253 | 8/1995 | Van Gorkom et al. | 313/422 |
| 5,446,337 | 8/1995 | Yokomakura et al. | 313/422 |
| 5,451,835 | 9/1995 | Yamazaki et al. | 313/422 |
| 5,465,024 | 11/1995 | Kane | 313/422 |

Primary Examiner—Leo P. Picard
Assistant Examiner—Lynn D. Feild

[57] ABSTRACT

A Computer Desktop-keyboard Cover with built-in Screen Monitor Attachment is disclosed that could take the place of CRT Monitors customarily associated with desktop workstations. Many such keyboards are entirely unprotected, while some have a retractable tray that fits under a metal hood on which the CPU rests for storing and protecting the keys. The Cover & Screen Monitor device herein described makes this feature unnecessary since the keyboard is provided with its own cover. And when not in use the keyboard may be placed on top of the CPU where the CRT Monitor was before. The attachment device may be bolted to desktop keyboards of various designs and sizes, by a specially-designed hinge mechanism attached externally to each side of the keyboard body. The Screen Monitor Display device is directly and independently connected electrically to the systems-unit (CPU) and to the electric power supply. The display screen utilizes the LCD or other Flat-screen technology, the quality of which has been greatly improved over recent years, and is now fully comparable with most CRT monitors.

1 Claim, 8 Drawing Sheets 5,781,406

COMPUTER DESKTOP KEYBOARD COVER WITH BUILT-IN MONITOR SCREEN & WRIST-SUPPORT ACCESSORY

BACKGROUND OF THE INVENTION AND PRIOR ART

1. Field of the Invention

This invention relates to visual screen apparatus used to display input to and/or output from electronic devices such as computers and/or computer terminals. More specifically, the invention relates to LCD or other flat panel displays embodied in a keyboard Cover and built-in screen monitor attachment device for computer desktop keyboards only, that also protects the keyboard when the cover is in a closed position.

2. Description of the Prior Art

Computers are now everywhere. Fifty years ago when the first computer was switched into use in the Eastern United States no one could have foreseen what would develop in the electronic world. Today, advances continue to be made, and the opening of universal access to the Global Internet and the services provided by competing Networks and Cable TV companies, are keeping electronic technicians busily engaged in constantly trying to break-through into fresh frontiers of science.

But there is a need to pause and consider what improvements could still be made to technology and equipment that has become commonplace. This invention addresses this. It is a basic and simple idea that, in many situations, could provide an alternative for the heavy VGA Monitor using Cathode Ray Tube technology, that is now standard equipment in most computer desktop systems. These monitors have to be large because the CRT technology requires deep housings for rays to be beamed onto the screens. But modern technology over recent years has provided other means producing very good imaging comparable with CRT displays, using Liquid Crystal Display (LCD) and other technologies such as "Flat-panel" and cold-cathode ray emissions, as set forth in the Kane U.S. Pat. No. 5,465,024, and other 'thin-screen' narrow components and vacuum envelopes, as under the Van Gerkom U.S. Pat. No. 5,442,253; the Yokomakura U.S. Pat. No. 5,446,337; and the Yamazaki U.S. Pat. No. 5,451,835. And these devices are not as susceptible to vibration damage as are the CRT Monitors.

The foregoing reasons are why this modern technology is being embodied in this invention for a computer desktop system whereby the keyboard component will have its own integrated Cover with built-in display Screen Monitor, directly connected electrically to the system' CPU, using a novel, specially engineered, hinging mechanism that is readily attachable and detachable to users' existing keyboards by means of bolts.

3. Recent Developments of prior art relative to Student Classroom Computer Laboratories Computer-age technology is being developed at such a rapid pace, it is difficult to know and distinguish what is 'prior art' or 'contemporary art'. One such example is 'computers in the Classroom'.

Technology has been developed by the Oracle Corporation of California to dispense with a separate CPU for each student station with keyboard and monitor. Powerful interfacing modems and modules connect multiple student stations to downloaded systems, programs and data base files from their Internet websites and databases. It is envisaged that the means provided by this invention will be of particular utility in this environment. And the feature of portability of the composite unit of keyboard and screen will enable students to carry home the equipment for use on their home PC, for homework and personal research.

4. Further description of prior art more recently developed, relating to Interactive TV Recently developed Interactive TV capabilities by some major Cable Television Network organizations now make it possible for CPU facilities to be provided over their fiber-optic cable lines. This technology requires only a computer desktop keyboard with the appropriate interface 'box' or module for direct link-up with the incoming TV cable.

According to this recently developed prior art, the regular home TV Screen can serve as the visual display for the interactive processing and functions of this new technology. But serious objection has been raised in many quarters about depriving the family of the Home TV Screen for this new Interactive TV. It is envisaged that the means provided by this invention could solve this problem by having for the first time ever, one composite computer keyboard with its own attached display screen, that could be hooked-up to the Interactive Cables coming into homes and offices almost everywhere globally in due time. The Home or Office TV screen would not have to be used for this purpose.

5. Original ideas

The original idea of the Inventor was to provide a Keyboard Cover for the exposed keyboard when a snack was being taken, and also to provide a 'hard-top' for writing notes over a 'live' keyboard, without the operator having to go elsewhere. The idea was that the Cover device would also 'double' as an ergonomic wrist support as well as 'mouse pad', using a natural cotton fabric to dissipate any static electricity, with a grounding wire. (These aspects are not included in the embodiments of this invention, nor do they form part of this application, but a 5" wide wrist-support and mouse-pad accessory that conveniently fits into the recessed cavity of the Cover has been provided as complementing the subject device of this invention. And it will be particularly useful for placement over the keyboard when the display screen is in use in its vertical position, attached or detached.)

These were the basic background ideas that developed into the present invention.

SUMMARY OF THE INVENTION

With the foregoing in mind, therefore, the object of this invention is to provide an apparatus for attachment to existing computer desktop keyboards in current use, as well as for new keyboards to be factory-fitted with the keyboard attachment device herein described.

This attachment device with display screen will enable a computer desktop workstation to consist of the systems unit (CPU) and the keyboard with Cover & Monitor only, thus eliminating the necessity of having a separate CRT Monitor now in almost universal usage with desktop computer workstations; and also obviate any need for a keyboard drawer or tray to protect the keys when not in use.

The subject device may be attached to existing keyboards by means of a 'do-it-yourself-kit' comprising: (1) the Keyboard Cover attachment with built-in flat panel screen display Monitor, (2) a standard connector cable om the Monitor to the CPU systems unit to replace the cable from the CRT monitor, and (3) the two metal housings containing the special hinge-arm mechanism ready to be bolted to the keyboard base.

The housings are permanently pre-riveted to the attachment device; and an instruction sheet provided showing the precise location for drilling the two 1/16" diameter holes in each side of the keyboard base, for bolting the lower portion of the hinge mechanism thereto.

It is envisaged that this invention will be of particular benefit to students attending School Computer Laboratories, plugged in to the in-house LAN NETWORK connected to the powerful Interface equipment to download systems, programs and database information from proprietary Networks and/or the Global Internet to multiple users in the classroom. Each student could have his/her own relatively inexpensive Keyboard and display Monitor.

Since the Desktop Keyboard fitted with the Cover with built-in Screen Monitor constitutes a compact single unit, this will be easily transportable in a carrying duffel bag. This will enable students to use the invention both in the classroom and at home for homework and other studies. At home, the Keyboard & Monitor could be connected to the home PC systems unit for operating the student's own installed programs For this, data files may be transferred on floppy disks and downloaded on the home PC.

But this invention will not be limited to the specialized student usage as outlined, with the advantage of individualized usage and portability. The embodiments of providing a cover for the open keyboard; of providing a wide screen monitor at a convenient and adjustable eye-level; and with multi-media equipment as an option, should make the means provided by the invention to be of commercial utility and universally desirable.

The recent announcements concerning Interactive TV, with the TV Cable Companies providing CPU facilities over their fiber-optic lines, will doubtless create a demand for a simple keyboard plus monitor unit without any CPU,. especially for those viewers who do not wish to tie up their home screens with the Internet and other interactive programs.

BRIEF DESCRIPTION OF THE DRAWINGS

FIG. 1 is a front perspective view (photo) of a customary Desktop Workstation, having three peripherals: Systems Unit, 1 Keyboard 2 and Monitor 3. Under the present Invention, the Monitor, as a separate unit, can be dispensed with.

2. Description of Drawings Also shown is the full side view of the hinge members attached to the base housing and the cover in its open stable position, by virtue of the 3-point support design. 11.

Figure 5:
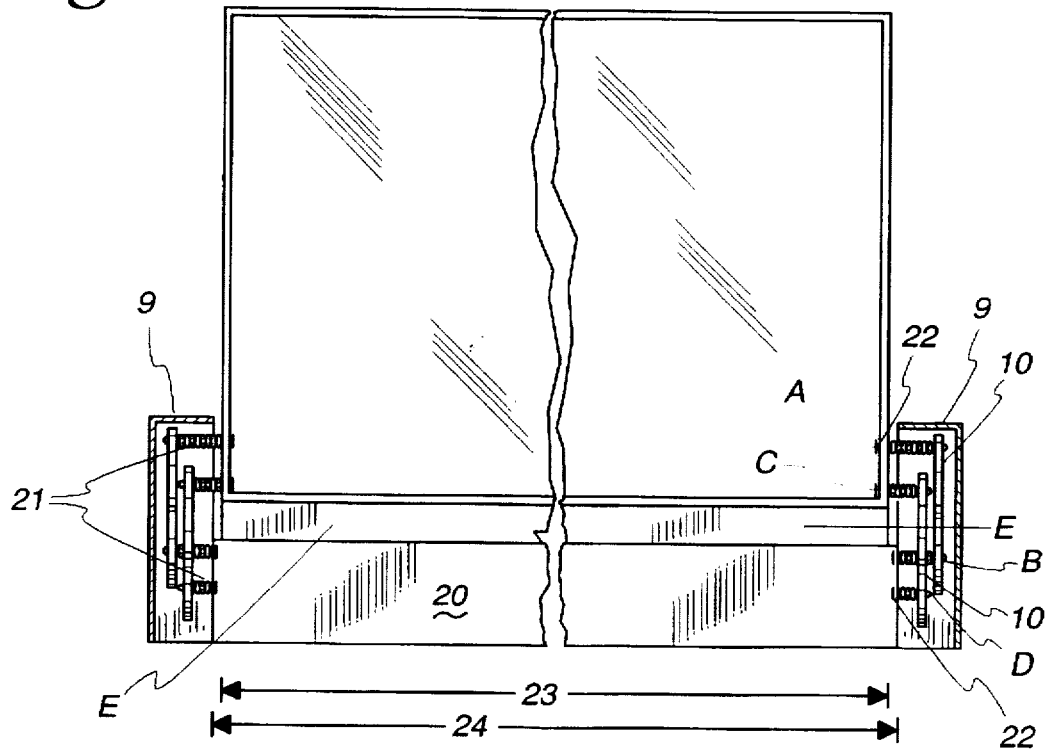

FIG. 5 (frontal view) shows the spacing friction washers, 21 are used to equalize the respective length dimension of the Cover Device as an 'add-on' attachment to the various sized keyboards. 20. Also shown is an example how an IBM keyboard having a length dimension of 19.25" 24 is fitted to standard Cover Unit of 18.0" 23. Two friction points have to be 'built-up'. In one place by ⅝" and in another by ¾". This drawing shows that points A & B are linked by the same arm member; and that points C & D are similarly linked. The point of contact between the ½" 'lip' or flange of the top of the Cover device and the keyboard housing, is shown as point E. The effective forces that constitute the 3-point support system are therefore: one, points A & C combined; two, points B & D combined, and three, point E which runs the entire length of the keyboard The force of gravity keeps the said Cover at an angle of recline of about 25 degrees from the perpendicular.

Figure 5A:
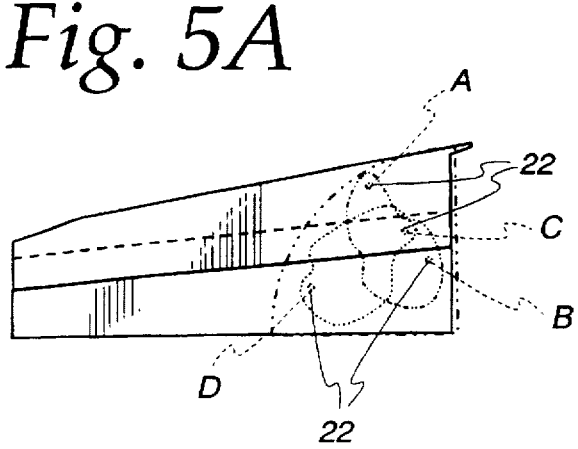

FIG. 5A is a side view perspective of the of the hinges attached to the bottom and top housings. The hinge members are identical in shape and size, but are pivoted from different points and perform differently because of the strategic points of attachment 22 to the keyboard and cover segments of the composite unit. The hinge members 10 rotate in opposite directions touching each against the other, (for purposes of stability) but not obstructing the opposite directions in which they rotate when activated for opening and closing of the Cover to the Keyboard.

Figure 5B:
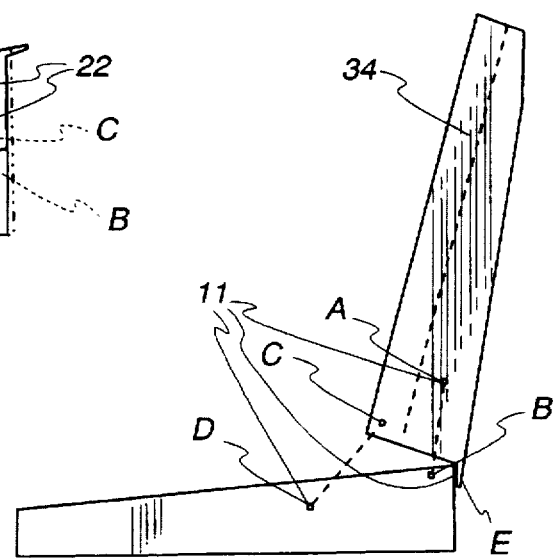

FIG. 5B. When opened a three-point support 11 is attained to ensure a stable resting position for the Cover with Monitor for comfortable viewing. 34

Figure 6:
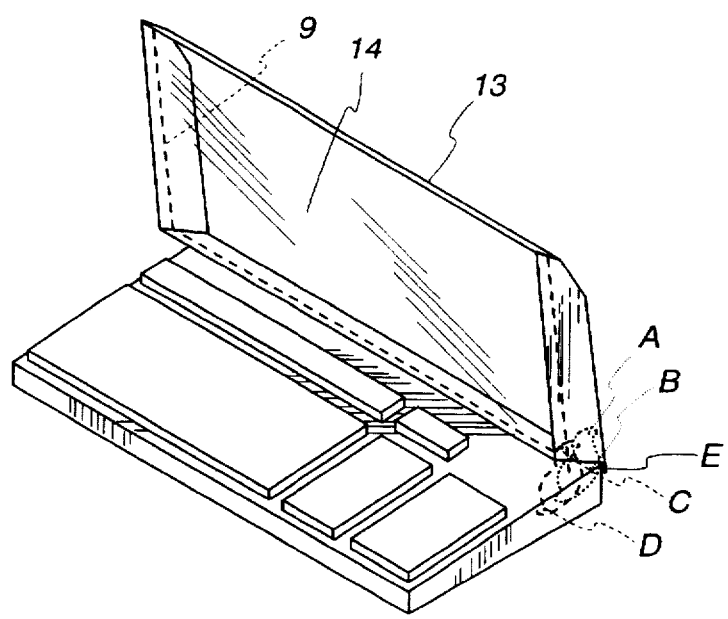

FIG. 6 is a front view perspective, of the Keyboard showing the glass face 14 for the monitor: This glass panel also serves as the 'ceiling' 19 of the recessed cavity 17 that accommodates the protruding keys, when the cover is closed. 18

Figure 6A:
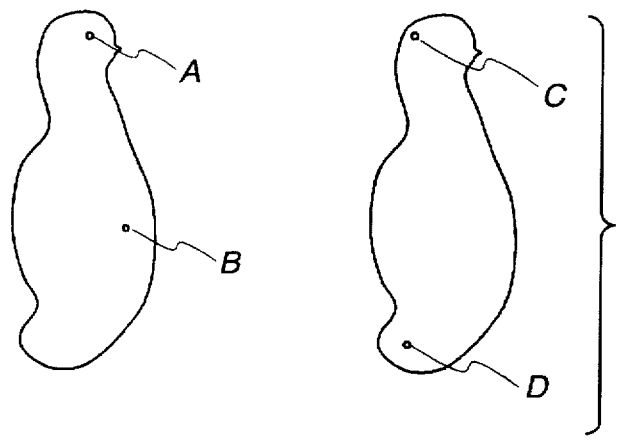

3. Description of Drawings FIG. 6A. The hinge members.

Figure 6B:
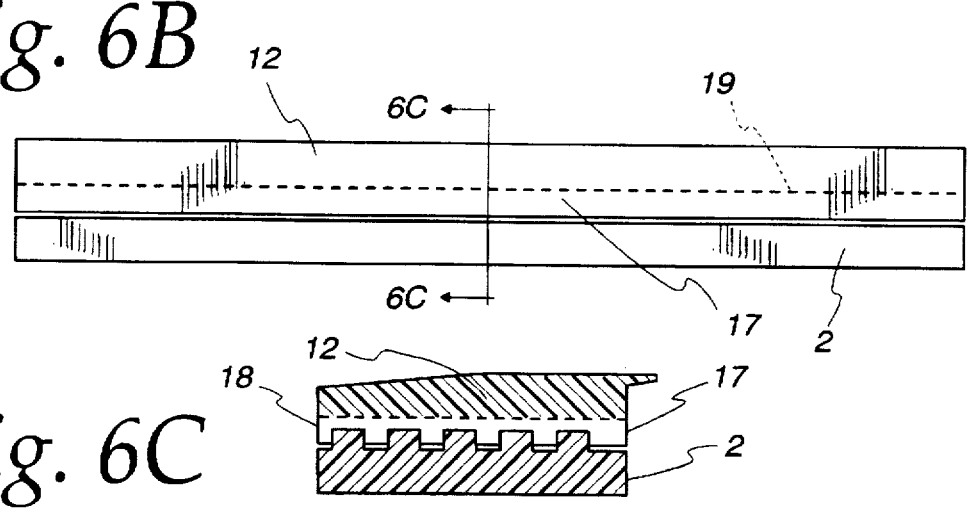

FIG. 6B. The hollow compartment is immediately to the rear of the glass face 12. The video display-screen components and fittings are housed in this hollowcompartment which is the top section of the Cover unit.

Figure 6C:
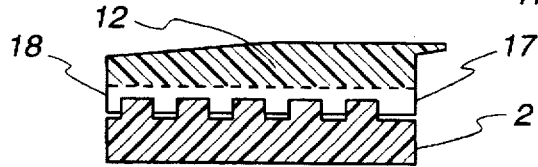

FIG. 6C. A cross-section of the hollow compartment is given. The Cover unit is made of injection molded plastic material. 13.

Figure 7:
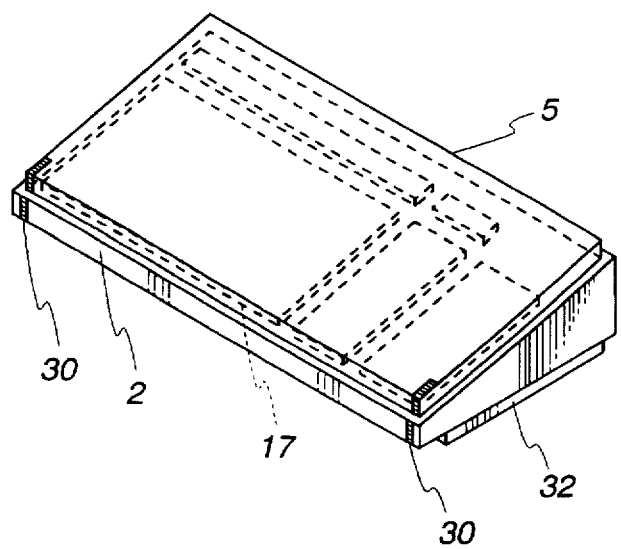

FIG. 7 is a front perspective showing the Accessory placed on the keyboard manually to provide a writing surface and to protect against damage, without depressing any keys. The Accessory may be placed under the keyboard to raise the height for better typing position, (see FIG. 8, 11) or placed in front of the keyboard to be a receptacle for the ergonomic wrist support devices: either a solid rubberized pad or a shaped form with pad that rests in the upturned tray, or lips on to the edge of the keyboard with fastening tape that is permanently installed on both units.(see FIG. 2, 3) The two-part interlocking fastening tape used at the front side-ends of the keyboard and at the ends of the Cover unit are shown. 30 By this means the units are kept in place: whether resting on the keyboard; or under the keyboard, 32 or in front of the keyboard when used as the wrist support.(FIG. 8, 11).

Figure 8A:
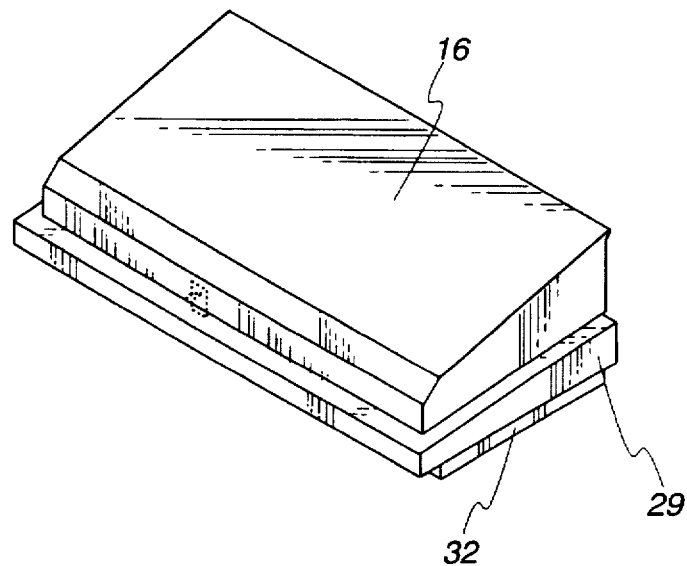

FIG. 8A is a front perspective view of the generic Keyboard Cover and Monitor in a closed position with the accessory Cover device stored under the keyboard itself. 32.

Figure 8B:
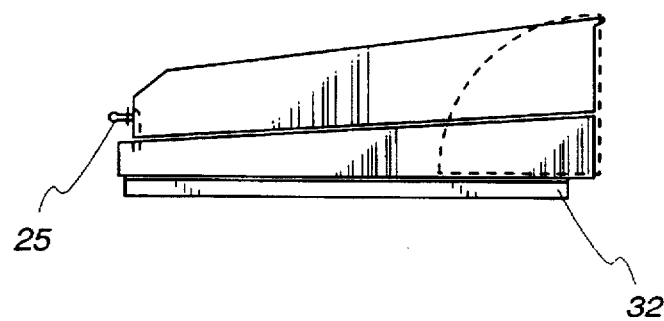

FIG. 8B shows a perspective view of the key-lock 25 fitted to the front of the cover to enable control of access to the keyboard, and thus to the Internet. The Cover is in the closed position. 16 and the external hinges are not shown. These external hinges are temporary appurtenances until the composite unit can be manufactured with the hinge mechanism included within the housings of both the keyboard and the Monitor Cover.

4. Description of Drawings FIG. 9. shows two front perspective views of the Accessory Unit (Model 2) 5. First, as the hard-top writing surface when placed over the keyboard keys 28; and secondly, a view of the accessory unit turned bottom-side up; 27. showing the receptable 31 for an extraneous wrist support device 35 to nest in the cover accessory when placed on the edge of the keyboard for prevention, or amelioration, of Carpal Tunnel Syndrome disease.

Figure 10:
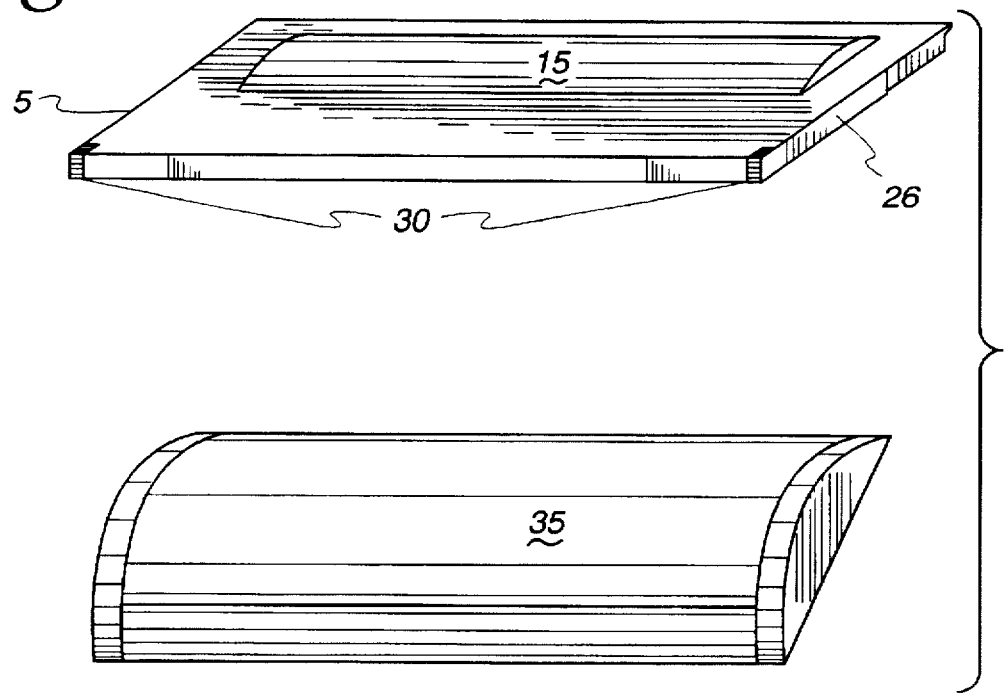

FIG. 10 is a frontal view of the accessory fitted with the rubberized foam pad 15 for use when the accessory unit (manual Cover) is placed in front of the keyboard, 26 and held fastened together by means of the interlocking fastening tape. 30 This tape has a male and a female component, and is wrapped around the extreme front edges of both the keyboard base housing and the cover unit. When the Cover accessory unit is in any of the three positions, the fastening tape will make contact and be strongly fastened together. These positions are: a) covering the keyboard, b) in front of the keyboard serving as a wrist support device, and c) stored under the keyboard. Also shown on FIG. 10 is an extraneous wrist support accessory that fits into the upturned cover 'tray'. 35.

Figure 11:
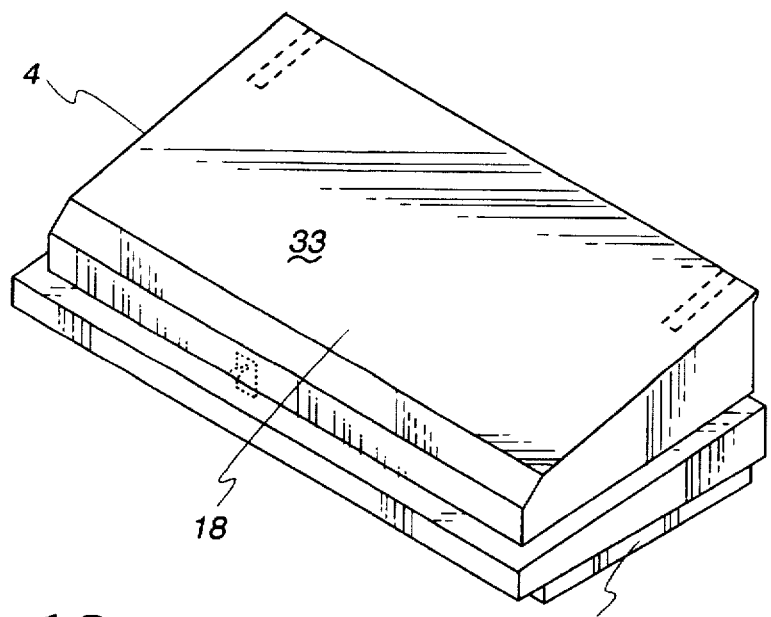
Figure 12:
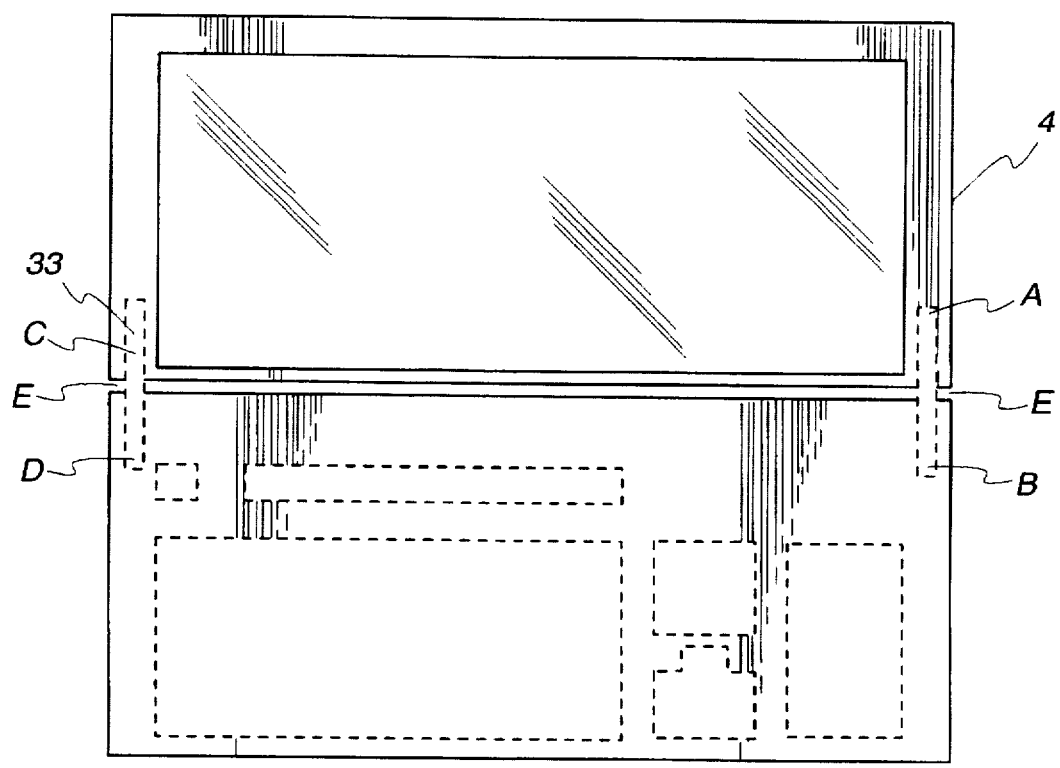

FIG. 11 & FIG. 12 show perspectives of the, Composite Desktop Computer Keyboard with built in Cover and Screen Monitor. 4 The side housings for the hinge mechanism are absent, as the hinge is internally mounted; 33 but the principle is the same, with the cover resting on the rear edge of the keyboard. The detail of the internal hinge is shown on a large scale. Here the Keyboard is resting on the Accessory Cover unit to complete the picture of 'compositeness'. 32

Figure 12A:
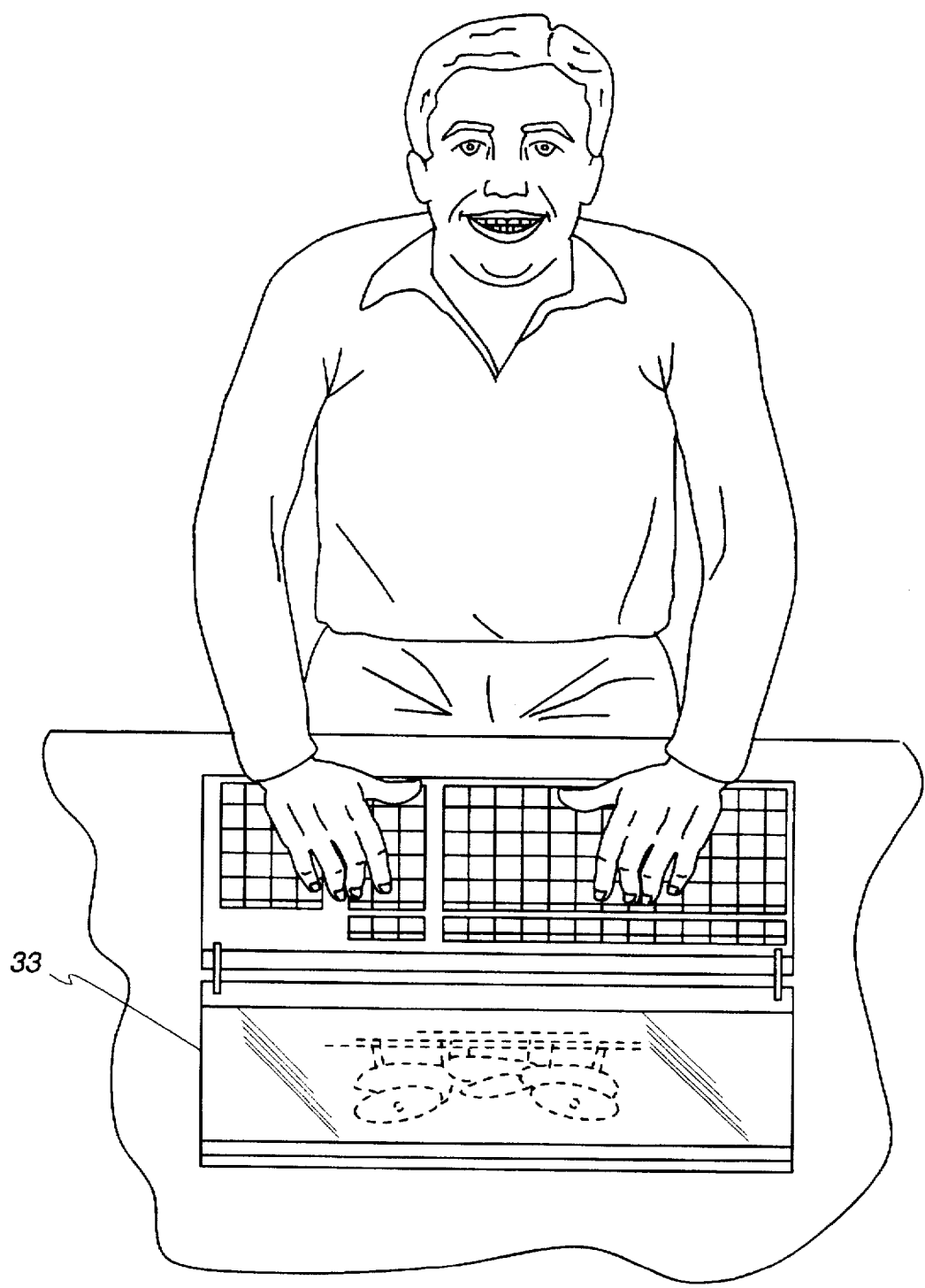

5. Description of Drawings FIG. 12A is an overhead perspective view (Magazine clipping) of a Desktop Keyboard with Monitor screen attached with the hinge mechanism as set forth in this invention. 33 The Keyboard has its own integrated Monitor Screen, eliminating the separate Cathode Ray Tube Monitor. Only the CPU is needed. And with access to the Internet becoming all the more prevalent, where it will be soon possible to access an Operating System, as well as programs for various application, plus data bases, this single composite Keyboard will fill a great need to bring the computer technology within the reach of millions who might otherwise be debarred by high costs.

GENERAL DESCRIPTION

Figure 1:
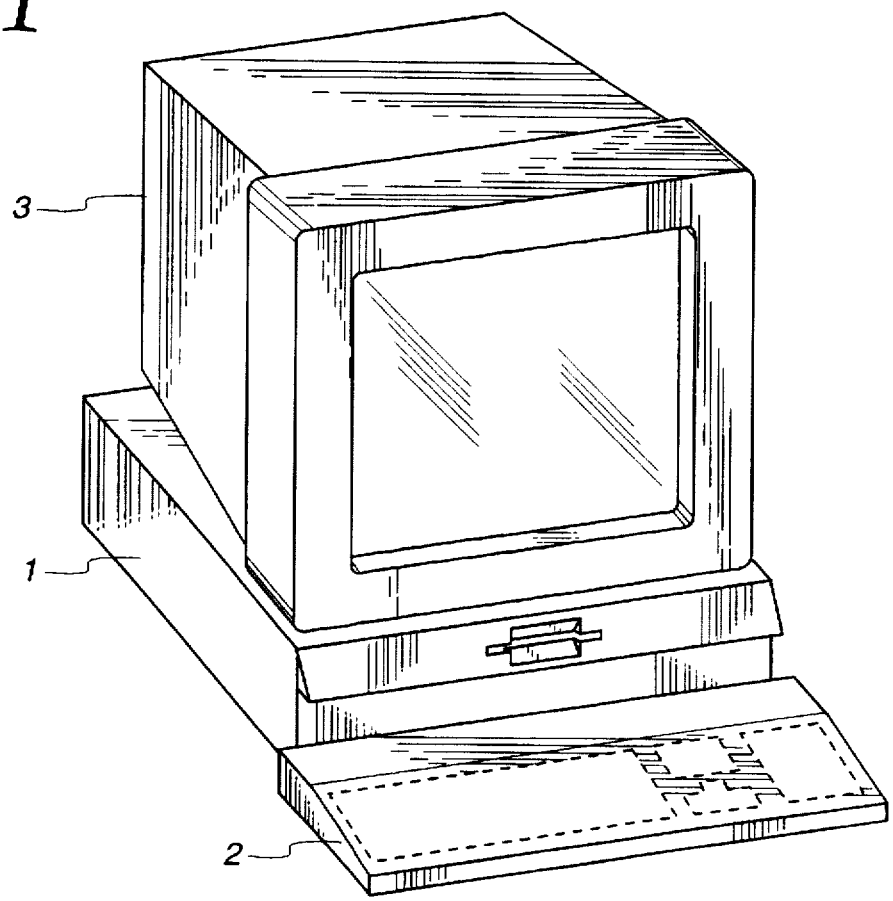

The "Generic Desktop Computer Keyboard Cover & Monitor" describes the Invention of a new addition to computer peripheral equipment for the standard Desktop Computer Workstation of PCs or Macintosh computers. The conventional 3-piece configuration comprises a Systems Unit (CPU), 1 a Keyboard, 2 and a Cathode-Ray-Tube (CRT) Monitor. 3 [FIG. 1]

The present Invention is to provide a device for computer technologists and hardware manufacturers to produce a Cover-with-Monitor Attachment to Desktop Keyboards to replace the CRT-Monitor 3 with a Desktop Keyboard Cover and Video Screen 4 thereby upgrading the existing desktop keyboards, by converting these input-devices to become also output-devices, for text and graphics displays on the wide Video Screen; 6 and also to provide a Flat Keyboard Cover Accessory 5 to protect the keyboards from contamination from unwanted materials. This accessory is to be used before said Cover with built-in monitor is manufactured; and to be used afterwards also, to complement and be used in conjunction with, the said combined keyboard and monitor unit; 4 and to provide an ergonomic wrist support to prevent or ameliorate the disease of Carpal Tunnel Syndrome. 26. [FIG. 2].

Figure 3:
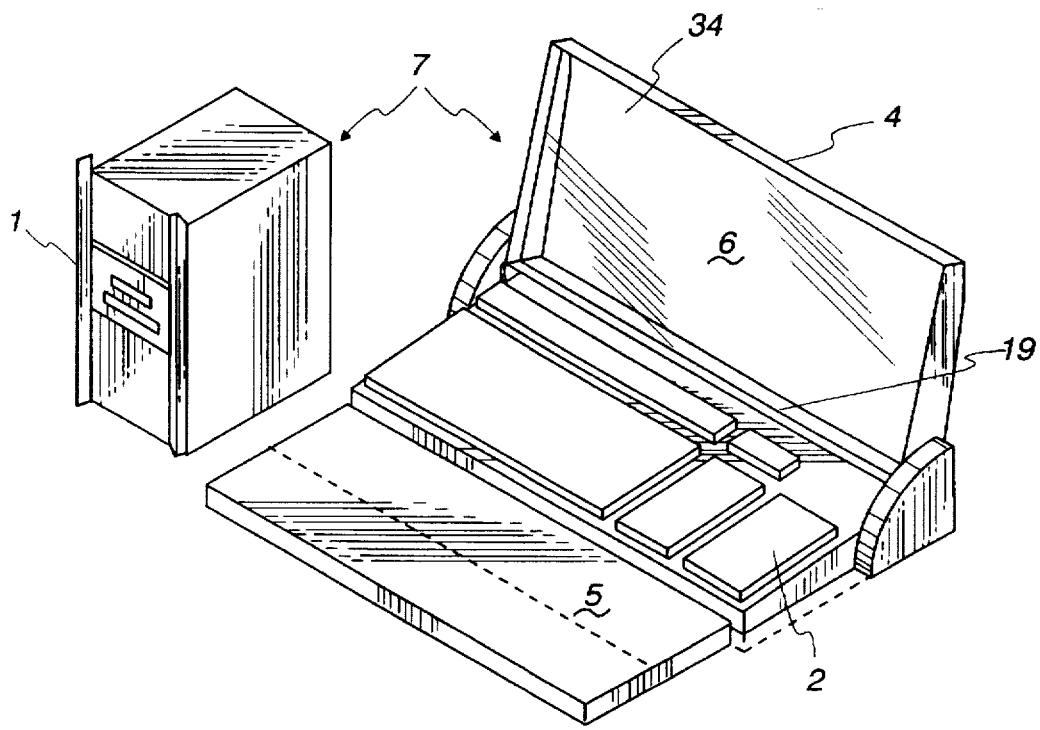
FIG. 3 is a perspective front view of the new configuration that is envisaged to be the normal desktop workstation of the future; 7: a systems unit (CPU) and the Keyboard with built in Monitor. This drawing shows the Keyboard and the Monitor as one composite unit, 4 but with the external hinge mechanisms from the 'add-on' kit that will be available for users to upgrade their existing keyboards. But the wave of the future will be factory produced keyboards with the Monitor hinged internally, which is provided for in this invention (see FIG. 9). The Cover is in the open position showing the wide screen.(diagonal index of 18.5") 6 The Monitor is shown positioned at the correct angle of approximately 25 degrees from the perpendicular, for comfortable viewing by operators. 34

This invention transforms the usual 3-piece workstation as above stated into a two-piece configuration. 7 For the first time, the large, bulky CRT-Monitor 3 will no longer be essential for the standard desktop configuration. [FIG. 3]

And the new concept also removes a drawback for DESKTOP KEYBOARDS, namely, they no longer have to remain unprotected from dust and debris.

This attachment 4 and the associated accessory 5 have been designed and developed to be available as "add-on kits" to be attached to existing keyboards by users, on a "do-it-yourself" basis. [FIG. 3]

Figure 4A:
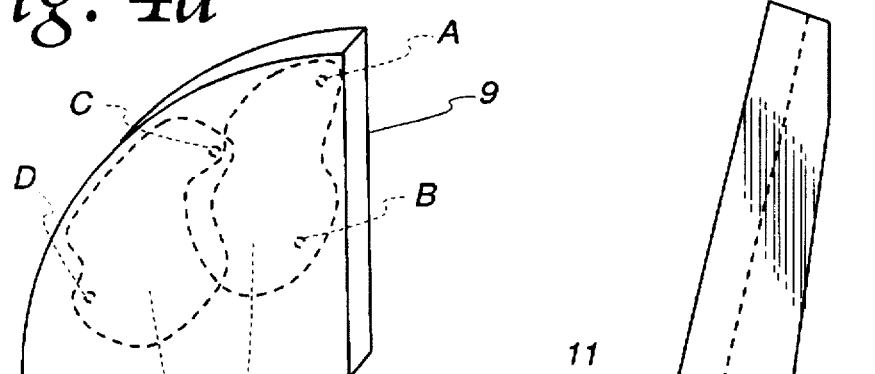
FIG. 4A and 4B show a perspective side view of the hinge mechanism contained in its metal housing, ready to be attached to the Cover as one part and the base housing of the keyboard as the other part 9, with hinge members. 10
Figure 4B:
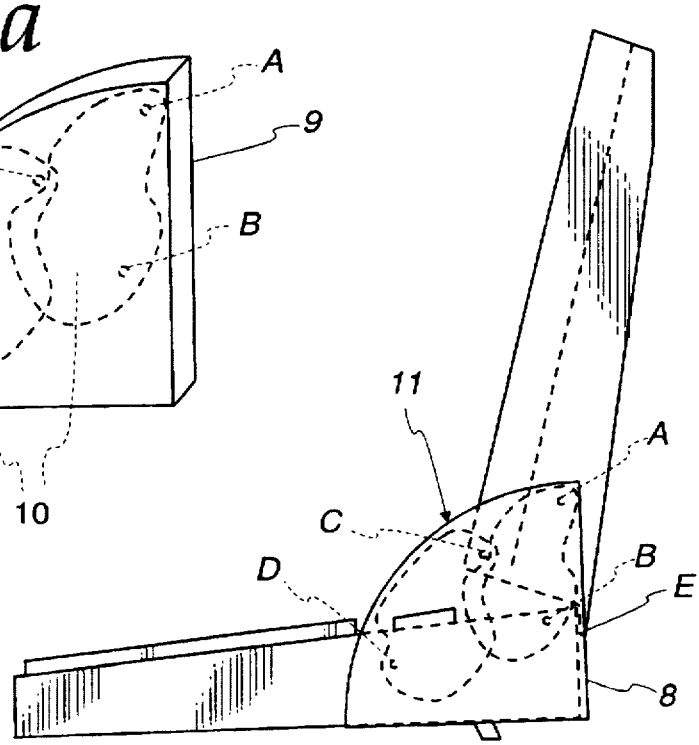

This present invention involves an innovative design and methodology for attaching the Cover/Monitor device to the Keyboard by means of a two-member hinge-mechanism 8 rotating in opposite directions 10 that enables the Cover to be opened and the screen placed in a fixed position at the correct angle of recline for viewing, by means of a three-point support arrangement. 11 The present invention embodies a hinge-mechanism fitted externally to each side of the base-housing of the desktop keyboard; enclosed in a metal housing. 9 [FIG. 4A ]. The mechanism will be assembled and arrive in the Kit attached to the Cover device, ready to be bolted to the keyboard base in the two designated hinge-points. [FIG. 5]

According to the First Aspect of this present Invention, the Desktop Keyboard Cover Device (hereinafter referred to as Model 1) 4 provides a hollow compartment in the top section of the Cover, 12 to house all the components for the 'Flat-Panel' Video Screen Monitor. This Cover/Monitor device housing is made of Injection Molded plastic material, 13 having a face-glass for the screen. 14 [FIG. 6] The said Cover has been designed and developed to be attached and hinged 8 to the base housing 29 of the Desktop Computer Keyboard to fit exactly over the Standard 101-key layout Desktop Keyboard, when in the closed position. 16 [FIG. 8] The lower portion of the rectangular Cover-with-Monitor Unit has vertical walls on the perimeter providing for a recessed cavity 17 about ⅝" deep, allowing the Cover of the Desktop Keyboard to be closed without depressing any keys, in case this is necessary, while the power is still turned on. 18 [FIG. 11]

The 'glass-face' of the wide-screen with a length dimension of 18 inches, and a width dimension of 6 inches, provides the 'ceiling' 19 of the recessed cavity for the key cover. [FIG. 3] This "Generic Desktop Computer Keyboard Cover and Monitor" 4 is so named because it may be fitted to any desktop computer keyboard existing in the world today. For although it has a standard length dimension of 18 inches, it is possible to be fitted to any keyboard with lengths varying from 17 inches up to over 20 inches. 20 [FIG. 6] The methodology herein disclosed is a novel, simple and ingenious invention to accommodate all desktop keyboard sizes. In order to ensure that the hinge-mechanism may be attached in parallel alignment with both the keyboard base housing component and the Cover/Monitor component, spacer friction-washers 21 are used at the point of contact where the hinge arm-members are bolted to the components. 22 In cases where the desktop keyboard length dimension is greater than the length dimension of the Cover/Monitor device, then the spacer-washers are placed between the hinge-arm and the Cover/Monitor 23; and in cases where the opposite is the case, with the keyboard housing being shorter than the Cover/Monitor, then the spacer-washers are placed in between the Keyboard housing and the hinge arm-member to maintain a firm and stable parallel relationship between the components. This simple but ingenious methodology ensures that one standard-sized Keyboard Cover and Monitor can be used in every situation. [FIG. 6]

For example, the standard IBM Keyboard is 19.25" long. The Cover/Monitor is 18" long. This means that ⅝ths or 0.625" must be added on each side of the Cover/Monitor Unit to increase width by a total of 1.25". This is done by placing an equal number of washers on each side between the hinge and the Cover Unit. 24 The bolt and nut will lock all together and the friction will be adjusted to ensure a firm and stable pivoting, articulating movement. In the event that a smaller Keyboard has to be fitted with the standard Cover/Monitor Unit, then the Keyboard Base Housing is built up by means of the spacer friction washers. In this way exact parallelism can always be achieved. This aspect of the present invention is original with this inventor, and is one of the Claims being made under this present application.

A Key-lock is installed in the Cover unit 25 whereby it may be locked by means of a cabinet-type lock located to the front of the Cover Device. Unauthorized access to the Computer is thereby controlled. Parental or custodial control of the use of computers will be facilitated.[FIG. 8B]

According to the Second Aspect of this present Invention, this is a companion desktop keyboard cover only, (exclusive of the Monitor). It is hereinafter referred to as Model 2, 5 and embodies a portion of the art as described under the First Aspect. This Model 2 does not does not involve electronic technology as such. It is straightforward computer accessory. [FIG. 10]

(a) The Keyboard cover (Model 2) is a rectangular frame of Injection Molded plastic material, having vertical walls on the perimeter, 5 approximately ⅝"deep (0.625"), designed and developed to fit exactly over the standard 101-key Desktop Keyboard, without depressing the keys. Model 2 is essentially the recessed cavity of the bottom section of the Cover attachment of the First Aspect, namely Model 1. 27 [FIG. 9].

(b) The exterior hard-top surface of this Cover device is flat and provides a writing surface and book-rest 28 so that operators do not have to move elsewhere for these reasons.

Figure 2:
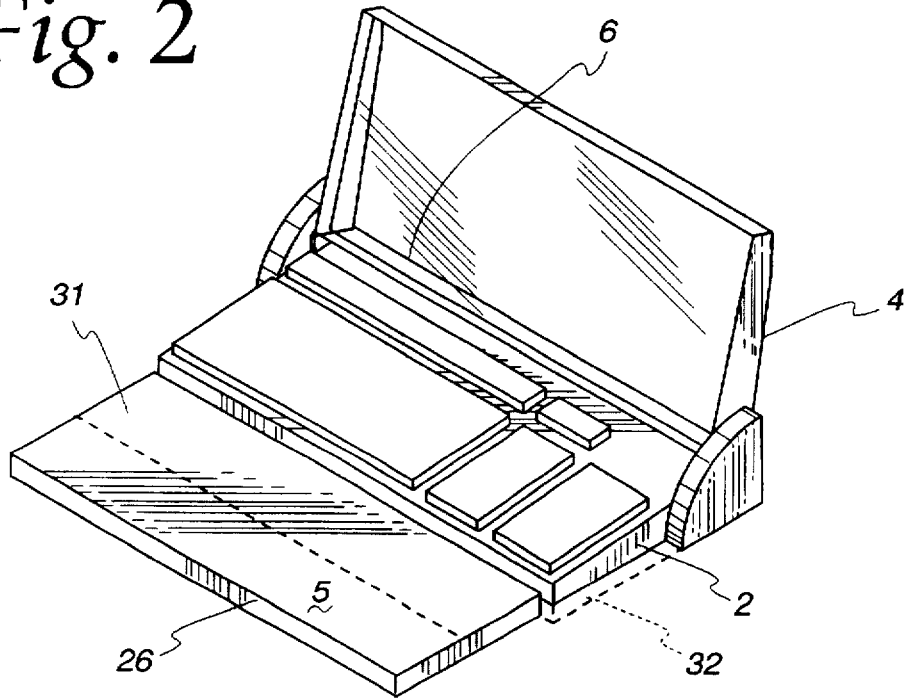
FIG. 2 shows the Desktop Keyboard with the 'add-on' Kit for the Cover with Monitor. Also the separate Cover accessory and wrist support 'tray' 31 is shown in front of the keyboard. The separate cover accessory 5 should be placed over the keys to protect from dust; or to provide a writing surface, 5 or a book-rest; or to protect keys when a snack is taken by operator. The cover accessory is may also be placed under the Keyboard itself for spacesaving storage. 32

(c) It performs its primary function as a protecting cover for the keys from dust and debris, including food or liquids that could be dropped by operators. 5 [FIG. 2]

(d) In addition to the above, the Cover Device has been designed to be used as a receptacle for an ergonomic hand-and-wrist support unit. 31, 35

Figure 9:
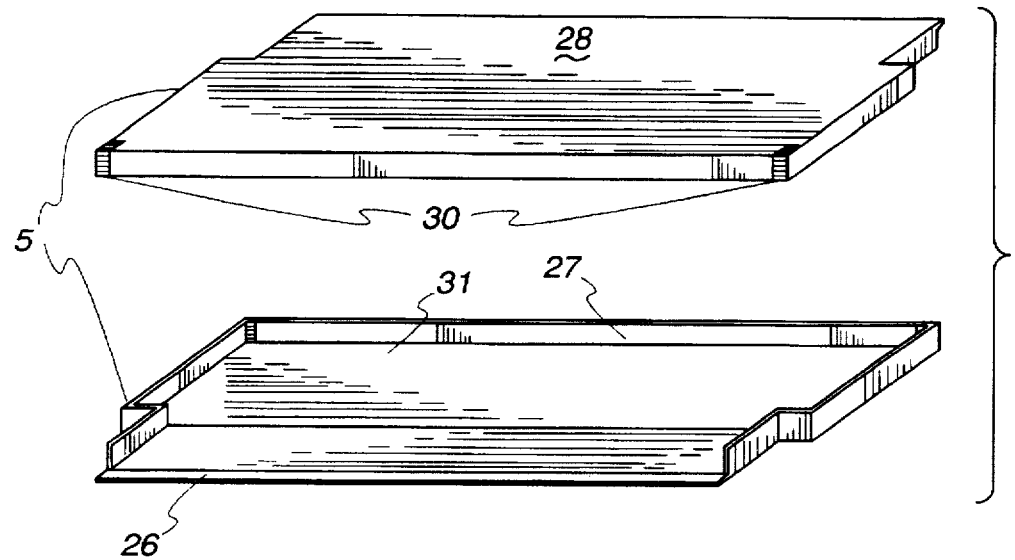

The unattached Cover is removed from resting on the keyboard over the keys; turned over to form a tray, 27 and placed next to the front of the computer keyboard. 31 The ergonomic WRIST SUPPORT unit with rubberized strip 15 is then placed in the 'tray'. 26 [FIG. 9] The unit is kept in its position next to the keyboard by means of fastening tape. 30 [FIG. 10]

(e) If the Cover device is not required for a wrist support, then the cover may be simply removed from covering the keys and placed under the keyboard, 32 where it has been designed to rest out of sight in a tidy manner without taking up any space on the desktop. The keyboard is elevated by ¾" (0.75") when the cover is placed under the keyboard, which is often beneficial in relieving stress on the hands and wrists. 34 [FIG. 8A]

According to the Third Aspect of this present invention, the Desktop Keyboard Cover and Screen Monitor and Keyboard, (hereinafter referred to as Model 3), 4 is a composite desktop keyboard having a base housing 29 [FIG. 2] in which is installed a keyboard cover with screen monitor, to create a composite computer peripheral 4 [FIG. 2] for PC and Macintosh workstation configurations; that could be produced on a commercial scale by interested hardware manufacturers utilizing recently developed USA technology for "flat-panel" or similar monitors. The said Cover with Screen Monitor 4 is essentially identical in purpose and function as the means described under the First Aspect (Model 1); the sole variation being that the components of the mechanism for attaching the cover to the keyboard, will not be externally mounted onto the two sides of the keyboard-housing, as in the case of Model 1. Instead, the apparatus embodying the hinge-mechanism will be installed within the surface perimeters of the keyboard housing, making it one composite whole 33 [FIG. 11], 33A [FIG. 12A] employing identical components and embodying the identical art and engineering principles as described under the First Aspect of this Invention as regards the 3-point linkage and support design for the Cover to be opened and positioned at the correct angle of recline for comfortable viewing by operators of the keyboard. [FIG. 2] & FIG. 12A. It is readily apparent that the above-described Desktop Keyboard Cover and built-in Screen Monitor apparatus for an electronic computer desktop keyboard instrument meets all of the objects mentioned above, and also has the advantage of wide commercial utility. It should be understood that the specific form of the invention hereinbefore described is intended to be representative only, as certain modifications within the scope of the these principles will be apparent to those skilled in the art addressed therein. Accordingly reference should be made to the following claims in determining the full scope of the invention.

Cross Reference of Element numbers stated in the General Description, and on the drawings.

| # | FIG. |
|---|---|
| 1. CPU | 1, 3 |
| 2. KEYBOARD | 1, 2, 3, 6B, 6C, 7, 19 |
| 3. CRT MONITOR | 1 |
| 4. NEW KEYBOARD WITH COVER & MONTIOR | 2, 3, 11, 12 |
| 5. FLAT KEYBOARD ACCESSORY - COVER | 2, 3, 7, 9, 10 |
| 6. WIDE SCREEN ON MONITOR | 2, 3 |
| 7. THE FUTURE 2-PERIPHERAL CONFIGURATION | 3, |
| 8. HINGE MECHAMSM-SIDE VIEW | 4A, 4B |

-continued

| # | FIG. |
|---|---|
| 9. METAL-HOUSING FOR HINGE MECH. | 4A, 4B, 5 |
| 10. HINGE MEMBERS-2 | 4A, 4B, 5A, 6A |
| 11. 3-POINT SUPPORT SYSTEM | 4A, 4B, 5B |
| 12. HOLLOW COMPARTMENT IN COVER ATTACHMENT | 6B, 6C |
| 13. INJECTION MOLDED PLASTIC MATERIAL | 6 |
| 14. GLASS FACE ON MONITOR IN COVER | 6 |
| 15. RUBBERIZED STRIP ON COVER ASSESSORY | 10 |
| 16. KEYBOARD COVER & MONITOR-CLOSED POSITION | 8A, 8B |
| 17. RECESSED CAVITY AT BOTTOM OF COVERS-BOTH | 6B, 6C, 7 |
| 18. COVER IN CLOSED POSITION-MODEL 3 | 6C, 11 |
| 19. CEILING OF KEY-COVER-FOR SCREEN MONITOR | 6, 6B |
| 20. ADAPTING'ADD-ON'TO VARIOUS SIZE KEYBOARDS | 5 |
| 21. SPACER FRICTION WASHERS | 5 |
| 22. STRAGETIC Points HINGE ARMS/COVER & KEYBOARD. | 5, 5A |
| 23. SYSTEM TO EQUALIZE DIFFERENT LENGTHS. | 5 |
| 24. IBM EXAMPLE OF KEYBOARD WITH COVER Device | 5 |
| 25. KEY-LOCK FITTED TO CONTROL ACCESS | 8B |
| 26. ACCESORY COVER ALSO USED AS WRIST SUPPORT | 2, 9, 10 |
| 27. BOTTOM SIDE OF COVER ACCESORY. | 9 |
| 28. HARDTOP WRITING SURFACE | 9 |
| 29. SEE #2 | 8A |
| 30. Fastening TAPE, 2-PART INTERLOCKING | 7, 9, 10 |
| 31. ACCESSORY AS RECEPTACLE FOR WRIST SUPPORT | 2, 6, 9 |
| 32. ACCESSORY UNDER THE KEYBOARD | 2, 7, 8A, 9, 11 |
| 33. FACTORY MADE-Internal hinges Model 3 | 11, 12, 12A |
| 34. MONITOR IN VERTICAL POSITION FOR VIEWING | 3, 5B, 8B |
| 35. EXTRANEOUS WRIST SUPPORT FORM THAT FITS TRAY | 10 |
| A, B, C ,D, E, | 4A, 4B, 5, 5A, 6A, 12 |

We claim:

1. In a desktop computer system wherein the desktop computer system has a main body containing a central processing unit therein and a stand alone keyboard electrically connected to the main body, said keyboard having front and back edges and left and right ends and is supported on a surface, the keyboard further having a keyboard attachment device comprising:

two metal housings being bolted to said left and right ends of the keyboard, each of said metal housings having a pair of double-acting articulating hinge arm members located therein, said hinge arm members rotate in parallel paths of opposite direction, a cover portion hingedly supported between said two metal housings, said cover portion having an interior side, an exterior side, a front end and a base end, said interior side including a recessed cavity containing a flat panel display;

the cover portion being foldable between an open and closed position;

the open position being vertical to said keyboard support surface wherein said base end of said cover portion rests against said back edge of said keyboard to provide support to said keyboard attachment device in the open position, said flat panel display being visible in the open position;

the closed position being placed over said keyboard to provide protection to the keyboard when not in use, said front end having a cabinet lock positioned therein to lock the cover to the keyboard when in the closed position;

the cover portion of said keyboard attachment device being electrically connected to said main body of said desktop computer system.

* * * * *